US012115616B2

(12) United States Patent
Walheim

(10) Patent No.: US 12,115,616 B2
(45) Date of Patent: Oct. 15, 2024

(54) HAND HELD POWER TOOL

(71) Applicant: ATLAS COPCO INDUSTRIAL TECHNIQUE AB, Stockholm (SE)

(72) Inventor: Torbjörn Walheim, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 268 days.

(21) Appl. No.: 17/620,279

(22) PCT Filed: Jun. 23, 2020

(86) PCT No.: PCT/EP2020/067495
§ 371 (c)(1),
(2) Date: Dec. 17, 2021

(87) PCT Pub. No.: WO2020/260279
PCT Pub. Date: Dec. 30, 2020

(65) Prior Publication Data

US 2022/0274226 A1 Sep. 1, 2022

(30) Foreign Application Priority Data

Jun. 27, 2019 (SE) .................................... 1930227-2

(51) Int. Cl.
*B24B 23/02* (2006.01)
*B25F 5/00* (2006.01)

(52) U.S. Cl.
CPC .............. *B24B 23/02* (2013.01); *B25F 5/006* (2013.01)

(58) Field of Classification Search
CPC ................................. B24B 23/02; B14F 5/006
See application file for complete search history.

(56) References Cited

U.S. PATENT DOCUMENTS 4,081,038 A * 3/1978 Andersson .............. B25F 5/006 279/142
5,839,517 A 11/1998 Gwinn et al.
(Continued)

FOREIGN PATENT DOCUMENTS

EP 0207034 A1 12/1986
EP 0294842 A1 12/1988
(Continued)

OTHER PUBLICATIONS

Atlas Copco Industrial Technique AB, International Patent Application No. PCT/EP2020/067495, International Search Report, Sep. 8, 2020.

(Continued)

*Primary Examiner* — Praachi M Pathak
(74) *Attorney, Agent, or Firm* — Moore & Van Allen PLLC; W. Kevin Ransom

(57) ABSTRACT

The present specification relates to a hand held power tool comprising a housing, the housing comprising a back handle portion at a back end thereof. And a front handle portion at a front end thereof, wherein a motor is arranged in the back handle portion and coupled to an outgoing axle extending through the front handle portion. Wherein the front handle portion comprises an inner tubular structure and an outer tubular gripping sleeve. The outer tubular gripping sleeve is circumferentially supported by at least two vibration absorbing resilient elements arranged around the inner tubular structure, such that a circumferential gap is formed between the inner tubular structure and the outer tubular gripping sleeve.

9 Claims, 2 Drawing Sheets

(56) References Cited

U.S. PATENT DOCUMENTS

| | | | |
|---|---|---|---|
| 6,234,256 | B1 | 5/2001 | Kettner |
| 8,851,960 | B2 | 10/2014 | Ikuta |
| 2007/0143966 | A1 | 6/2007 | Fischer |
| 2011/0263185 | A1 | 10/2011 | Nelson |
| 2012/0111595 | A1 | 5/2012 | Schadow et al. |
| 2018/0222032 | A1 | 8/2018 | Cheng et al. |
| 2022/0274226 | A1* | 9/2022 | Walheim ................. B24B 23/02 |
| 2023/0302553 | A1* | 9/2023 | Filho ......................... B23C 5/10 407/53 |

FOREIGN PATENT DOCUMENTS

| | | | |
|---|---|---|---|
| EP | 1787762 | A1 | 5/2007 |
| EP | 2266762 | A1 | 12/2010 |
| GB | 2154497 | A | 9/1985 |
| GB | 2439434 | A | 12/2007 |
| TW | M540026 | U | 4/2017 |
| WO | 03000470 | A1 | 1/2003 |
| WO | 2010074626 | A1 | 7/2010 |

OTHER PUBLICATIONS

Atlas Copco Industrial Technique AB, International Patent Application No. PCT/EP2020/067495, Written Opinion, Sep. 8, 2020.

Atlas Copco Industrial Technique AB, International Patent Application No. PCT/EP2020/067495, International Preliminary Report on Patentability, Oct. 13, 2021.

Atlas Copco Industrial Technique AB, Swedish Patent Application No. 1930227-2, Search Report, Feb. 6, 2020.

* cited by examiner

HAND HELD POWER TOOL

CROSS-REFERENCE TO RELATED APPLICATIONS

This application is a National Stage Patent Application (filed under 35 § U.S.C. 371) of PCT/EP2020/067495, filed Jun. 23, 2020 of the same title, which, in turn claims priority to Swedish Patent Application No. 1930227-2 filed Jun. 27, 2019 of the same title; the contents of each of which are hereby incorporated by reference.

FIELD OF THE INVENTION

The present invention generally relates to hand held power tools, more particularly to grinders configured to provide high output power.

BACKGROUND OF THE INVENTION

Hand held power tools for grinding are known to be used in various industries. Where for instance preparation for welds needs to be grinded, the hand held power tools need to have high power and provide high rpm in order to effectively grind such weld preparations. The tools used in such applications therefore as such tend to vibrate and thus impose considerable vibration on an operator handling the tool many hours per day, thus placing high demands on the ergonomics of the tool.

One known way of improving the ergonomic situation is that the handles of the grinder is provided with a resilient material which is arranged to absorb vibrations. However, given the high power and rpms delivered by such tools, this is often not enough to hinder the operators from being exposed to vibrations from the grinder.

Hence there exists a need for improvement in the field of such hand held power tools.

SUMMARY OF THE INVENTION

Accordingly, it would be desirable to provide a design enabling a more ergonomic handling of the tool imposing less vibrations on the operator of the tool. To better address this concerns a hand held power tool as defined in the independent claim is provided. Preferred embodiments are defined in the dependent claims.

According to a first aspect of the invention a hand held power tool is provided. The hand held power tool comprising a housing. The housing comprising a back handle portion at a back end thereof, and a front handle portion at a front end thereof, wherein a motor is arranged in the back handle portion and coupled to an outgoing axle extending through the front handle portion. The front handle portion comprises an inner tubular structure and an outer tubular gripping sleeve, and wherein the outer gripping sleeve is circumferentially supported by at least two vibration absorbing resilient elements arranged around the inner tubular structure, such that a circumferential gap is formed between the inner tubular structure and the gripping sleeve.

According to the first aspect, the handheld power tool provides an inventive solution to the concerns described above by means of a design wherein front handle portion comprises an outer gripping sleeve circumferentially supported by at least two vibration absorbing resilient elements arranged around the inner tubular structure, such that a circumferential gap is formed between the inner tubular structure and the gripping sleeve.

The hand held power tool according to the invention therefore cleverly provides improved ergonomics by means of the provision of one inventive structure, i.e. the inventive outer gripping sleeve circumferentially supported by at least two vibration absorbing resilient elements arranged around the inner tubular structure, such that a circumferential gap is formed between the inner tubular structure and the gripping sleeve. This since the at least two vibration absorbing resilient elements arranged around the inner tubular structure prevents vibrations from reaching the outer gripping sleeve.

The at least two vibration absorbing resilient elements arranged around the inner tubular structure also prevents heat transfer from the inner tubular structure to the outer gripping sleeve. Herby the outer gripping sleeve gets a lower temperature during use of the hand held tool comparted to prior art tool.

According to one embodiment, the at least two vibration absorbing resilient elements are vibration absorbing resilient rings. This allows for high vibration absorbing between the inner tubular structure and an outer tubular gripping sleeve.

According to one embodiment, the at least two vibration absorbing resilient elements have an arc shaped profile. Herby a high vibration damping between the inner tubular structure and an outer tubular gripping sleeve can be obtained.

According to one embodiment, the at least two vibration absorbing resilient elements are made of polyurethane. Herby a high vibration damping between the inner tubular structure and an outer tubular gripping sleeve can be obtained. And at the same time a long life time of the at least two vibration absorbing resilient elements.

According to one embodiment, the inner tubular structure further comprises an element at the front end thereof arranged to prevent the outer tubular gripping sleeve from moving in the axial direction. Herby the outer tubular gripping sleeve can be allowed to move a small amount in the axial direction and at the same time being able to move a small amount in the circumferential direction. According to one embodiment a small movement is also allowed between the inner tubular structure and the outer tubular gripping sleeve in radial direction to enable the function of the absorbing resilient elements.

According to one embodiment, the outer tubular gripping sleeve further comprises teeth's at the back end thereof arranged to interact with recesses at the front end of the back end handle portion so that the outer tubular gripping sleeve is prevented from rotating. Herby the outer tubular gripping sleeve is prevented from rotating.

According to one embodiment, the outer tubular gripping sleeve is a rubber coated steel pipe. Herby a solid and ergonomic grip of the front handle portion can be obtained.

According to one embodiment, the rubber is chloroprene or thermoplastic elastomer. Herby a solid and ergonomic grip of the front handle portion can be obtained. And at the same time a long life time of the outer tubular gripping sleeve.

According to one embodiment, the front handle portion is releasably arranged from the back handle portion. Herby the power tool can be manufactured in two separate pieces.

According to one embodiment, the inner tubular structure comprises a thread at the back end thereof arranged to be threaded into the front end of the back handle portion. Hereby the hand held power tool easily can be dismounted for service and maintenance. The front handle portion and the back handle portion is thus rigidly mounted to each other. Herby the tool becomes more robust since the front handle part and the rear handle part being rigidly assembled compared to prior art tool where the front spindle is movable.

According to one embodiment, the back handle portion comprises an air passage at the front end thereof arranged to prevent an increase of air pressure in the front handle portion. Herby an increase of air pressure in the front handle portion is prevented and thus grease in the bearing in the front handle portion will not be blown off by air that otherwise would have pass through the front handle portion.

According to one embodiment, the hand held power tool is configured to deliver an rpm in the range 1000-50000 rpm. The advantages of the inventive vibration damping handle structure design are of particular importance as the rpm delivered, and hence the vibration from the hand held power tool involved, increases.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWING

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION OF THE INVENTION

Figure 1:
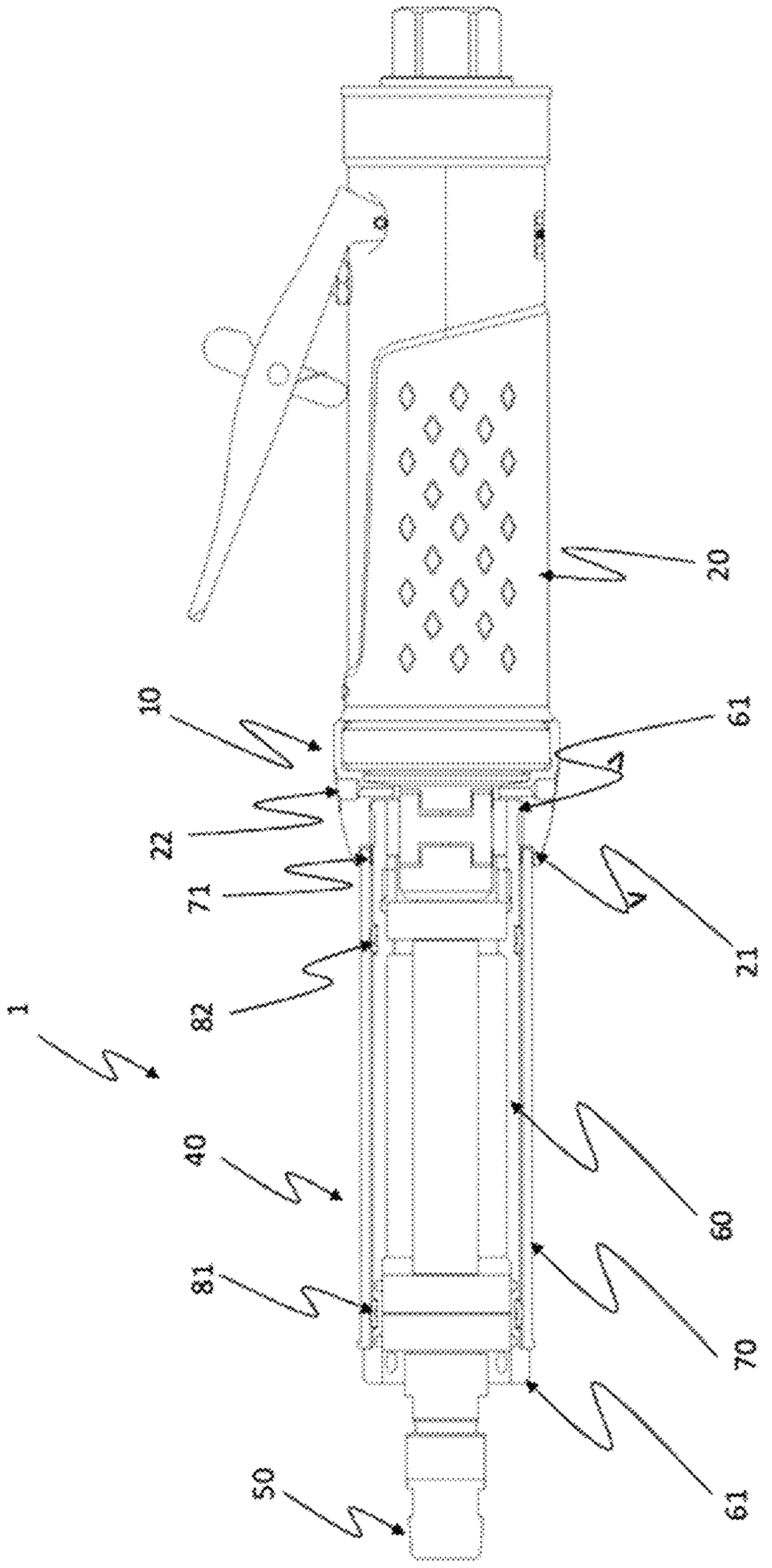
FIG. 1 is a side view of an exemplary hand held power tool according to one embodiment.

FIG. 1 illustrates the exemplary hand held power tool 1 in side view. The illustrated embodiment being an air powered straight type grinder comprising a housing 10. The housing 10 comprising a back handle portion 20 at a back end thereof and a front handle 40 portion at a front end thereof. A motor (not shown) is arranged in the back handle portion 20 and coupled to an outgoing axle 50 extending through the second handle portion 40. The second handle portion 40 comprises an inner tubular structure 60 and an outer tubular gripping sleeve 70. The outer tubular gripping sleeve 70 is circumferentially supported by two vibration absorbing resilient elements 81, 82 arranged around the inner tubular structure 60, such that a circumferential gap is formed between the inner tubular structure 60 and the gripping sleeve 70.

The hand held power tool 1 further comprises an element 61 at the front end thereof arranged to allow the outer tubular gripping sleeve 70 to move a small amount in the axial direction. The outer tubular gripping sleeve 70 further comprises teeth's 71 at the back end thereof arranged to interact with the recesses 21 at the front end of the back end handle portion 20 so that the outer tubular gripping sleeve 70 is allowed to rotate a small amount. The inner tubular structure 60 comprises a thread 61 at the back end thereof arranged to be threaded into the front end of the back handle portion 20. The back handle portion 20 comprises an air passage 22 at the front end thereof arranged to prevent an increase of air pressure in the front handle portion 40.

Figure 2:
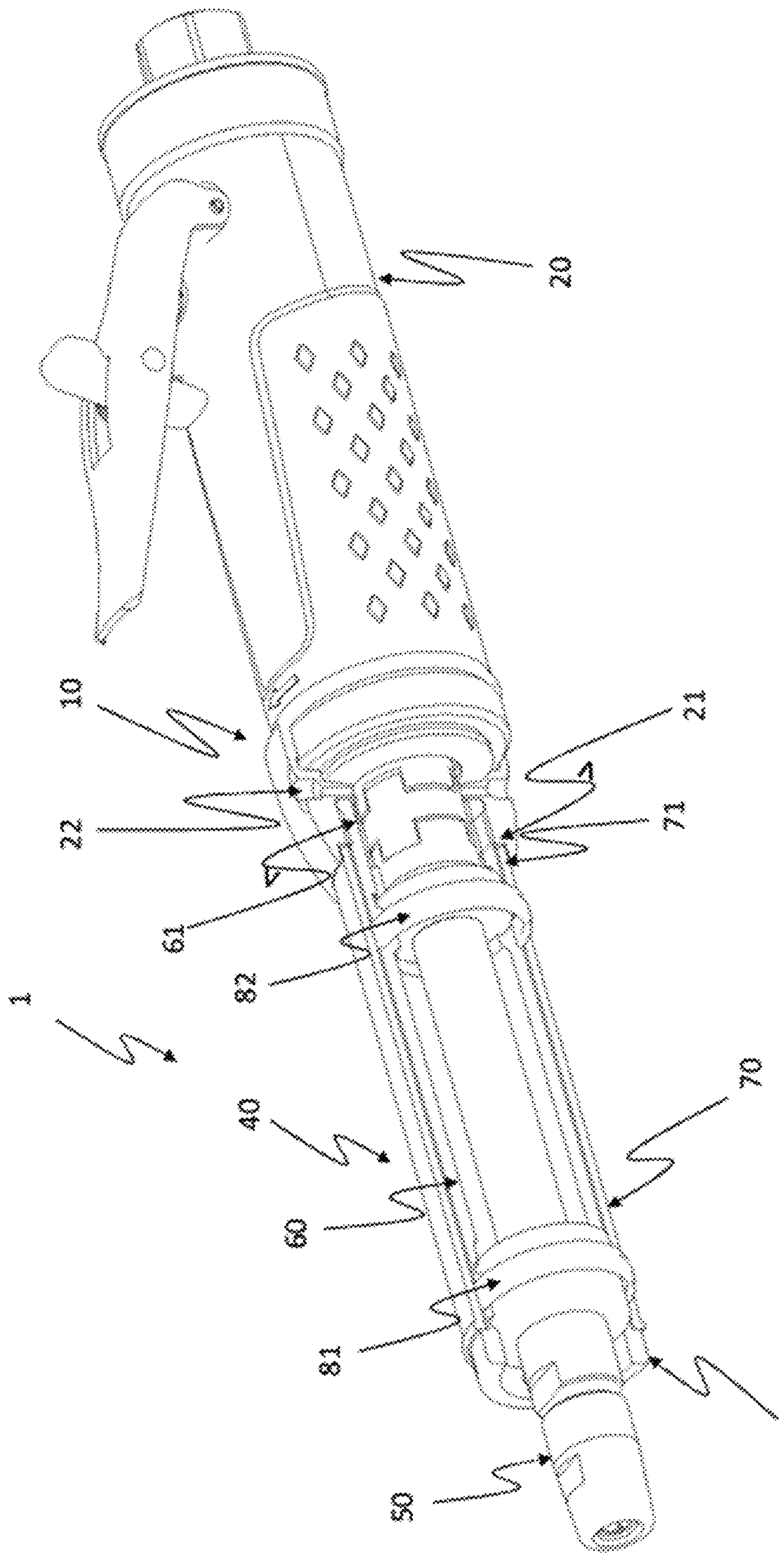
FIG. 2 is a perspective view of an exemplary hand held power tool according to one embodiment.

FIG. 2 illustrates the exemplary hand held power tool 1 in perspective view comprising a housing 10. The housing 10 comprising the back handle portion 20 at a back end thereof. And the front handle 40 portion at the front end thereof. The motor (not shown) is arranged in the back handle portion 20 and coupled to the outgoing axle 50 extending through the second handle portion 40. The second handle portion 40 comprises an inner tubular structure 60 and an outer tubular gripping sleeve 70. The inner outer tubular gripping sleeve 70 is circumferentially supported by two vibration absorbing resilient elements 81, 82 arranged around the inner tubular structure 60, such that a circumferential gap is formed between the inner tubular structure 60 and the outer tubular gripping sleeve 70.

The hand held power tool 1 further comprises an element 61 at the front end thereof arranged to only allow the outer tubular gripping sleeve 70 to move a small amount in the axial direction. The outer tubular gripping sleeve 70 further comprises teeth's 71 at the back end thereof arranged to interact with the recesses 21 at the front end of the back end handle portion 20 so that the outer tubular gripping sleeve 70 only can move a small amount. The inner tubular structure 60 comprises a thread 61 at the back end thereof arranged to be threaded into the front end of the back handle portion 20. The back handle portion 20 comprises an air passage 22 at the front end thereof arranged to prevent an increase of air pressure in the front handle portion 40.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A hand held power tool comprising:

a housing, the housing comprising:

a back handle portion at a back end of said housing; and a front handle portion at a front end of said housing;

an outgoing axle extending through the front handle portion; and a motor arranged in the back handle portion of said housing and coupled to said outgoing axle, wherein the front handle portion comprises an inner tubular structure and an outer tubular gripping sleeve, and wherein the outer tubular gripping sleeve is circumferentially supported by at least two vibration absorbing resilient elements arranged externally around said inner tubular structure, such that a circumferential gap is formed between said inner tubular structure and said outer tubular gripping sleeve, and wherein the at least two vibration absorbing resilient elements are vibration absorbing resilient rings, which rings have an arc shaped profile.

2. The hand held power tool according to claim 1, wherein the at least two vibration absorbing resilient elements are made of polyurethane.

3. The hand held power tool according to claim 1, wherein the inner tubular structure further comprises an element at a front end of the inner tubular structure arranged to only allow the outer tubular gripping sleeve to move a small amount in the axial direction.

4. The hand held power tool according to claim 1, wherein the outer tubular gripping sleeve further comprises teeth at a back end of the outer tubular gripping sleeve arranged to interact with recesses at a front end of the back end handle portion of said housing so that the outer tubular gripping sleeve only can rotate a small amount.

5. The hand held power tool according to claim 1, wherein the outer tubular gripping sleeve comprises a steel pipe coated in rubber.

6. The hand held power tool according to claim 5, wherein the rubber is at least one of chloroprene or thermoplastic elastomer.

7. The hand held power tool according to claim 1, wherein the front handle portion of the housing is releasably arranged from the back handle portion of the housing.

8. The hand held power tool according to claim 1, wherein the inner tubular structure of the front handle portion comprises a thread portion at the back end thereof arranged to be threaded into the front end of the back handle portion.

9. The hand held power tool according to claim 1, wherein the back handle portion comprises an air passage at the front end of the back handle portion and is arranged to prevent an increase of air pressure in the front handle portion.

* * * * *